(12) United States Patent
Ré

(10) Patent No.: US 8,714,028 B2
(45) Date of Patent: May 6, 2014

(54) INSERTION VORTEX FLUID FLOW METER WITH ADJUSTABLE GEOMETRY

(75) Inventor: Daniel Ré, Les Agettes (CH)

(73) Assignee: CLA-VAL Co., Costa Mesa, CA (US)

( * ) Notice: Subject to any disclaimer, the term of this patent is extended or adjusted under 35 U.S.C. 154(b) by 496 days.

(21) Appl. No.: 13/037,005

(22) Filed: Feb. 28, 2011

(65) Prior Publication Data

US 2011/0209559 A1 Sep. 1, 2011

(30) Foreign Application Priority Data

Mar. 1, 2010 (CH) .......................................... 265/10

(51) Int. Cl.
*G01F 1/32* (2006.01)
(52) U.S. Cl.
USPC ...................................................... 73/861.22
(58) Field of Classification Search
CPC ........................................................ G01F 1/32
See application file for complete search history.

(56) References Cited

U.S. PATENT DOCUMENTS

| | | | | |
|---|---|---|---|---|
| 2,826,914 A | | 3/1958 | Reiley | |
| 3,977,249 A | * | 8/1976 | Wittig | ......................... 73/861.67 |
| 4,030,359 A | * | 6/1977 | Stapler | ........................ 73/861.92 |
| 5,753,826 A | * | 5/1998 | Kashimura et al. | ......... 73/861.22 |
| 5,844,152 A | * | 12/1998 | Lambert | ....................... 73/866.5 |
| 6,298,734 B1 | | 10/2001 | Storer et al. | |
| 6,460,406 B1 | * | 10/2002 | Drain et al. | ................... 73/53.01 |
| 2007/0114023 A1 | | 5/2007 | Roy | |
| 2008/0028849 A1 | * | 2/2008 | Matsubara | ....................... 73/197 |
| 2008/0141785 A1 | * | 6/2008 | Wang et al. | ................ 73/861.22 |
| 2008/0314160 A1 | * | 12/2008 | Keese et al. | ................ 73/861.22 |

* cited by examiner

*Primary Examiner* — Harshad R Patel (74) *Attorney, Agent, or Firm* — Kelly & Kelley, LLP (57) ABSTRACT

A fluid flow meter includes a fitting attachable to a waterworks valve or pipeline so as to extend at least partially through an insertion aperture thereof. A measurement cylinder is pivotally attached to the fitting, and includes a fluid vortex generating obstruction. A sensor body extends through the fitting and has a sensor element at an end thereof disposed in the measurement cylinder and generally aligned with the obstruction to detect fluid vortices generated by the obstruction. The measurement cylinder is selectively movable from a position generally aligned with the fitting, to a position generally parallel to the fluid flowing through the valve or pipeline.

27 Claims, 8 Drawing Sheets

INSERTION VORTEX FLUID FLOW METER WITH ADJUSTABLE GEOMETRY

BACKGROUND OF THE INVENTION

The present invention generally relates to fluid flow meters for valves and pipelines. More particularly, the present invention relates to a flow meter based on the principle of vortex which is capable of being inserted into small insertion holes of the waterworks valve, pipeline, etc. and which is capable of measuring very low fluid flow rates.

In fluid dynamics, it is well known that when fluid encounters an obstacle placed in the axis of the fluid flow, it divides and creates small eddies or vortices on alternate sides of the obstacle. The generation of a succession of alternating turbulent waves is called a Karman vortex street. The frequency of detachment of the vortices, or the generation of the vortices, is directly proportional to the velocity of the fluid.

Insertion vortex flow meters are based upon this phenomenon. The vortices detachment generates zones of variable pressure that form small pressure surges and can be detected using a sensor positioned at a site downstream of the obstacle.

Currently, such current flow meters have limitations. The existing flow meters function in a permanent turbulent flow range defined by a Reynolds number above 5000, generally equivalent to flow velocities greater than 1.5 feet/second (0.5 m/s). This flow regime establishes a stable Karman vortex street, which is easily detectable by unsophisticated electronics.

While measuring fluid flows greater than 0.5 m/s and defined by a Reynolds number above 5000 covers the vast majority of industrial applications, in the potable water field supply systems (waterworks systems) such systems are generally designed for a maximum of speed of about 3 feet/second (about 1 m/s) and have a much lower minimum velocity. This is especially the case when there is low consumption, such as during the nighttime hours, where the water can practically be stopped with little fluid flow in the waterworks system. In fact, there can be many time periods or instances when the water flow is between 0.2 m/s and 0.5 m/s. Such low fluid flows create vortex waves having a much lower Reynolds number than 5000, and whose detection requires more sophisticated electronics and an appropriate algorithm which has heretofore been unavailable.

Another problem with current flow meters is the mechanical insertion of the flow meter into the pipeline. In order for the measurement cylinder of the flow meter to be oriented correctly and have sufficient space between the obstacle and the measurement sensor, a length of at least 1.5 inches (about 40 mm) is required. Accordingly, an insertion aperture or boss is needed in the control valve, butterfly valve, filter, joint, or portion of the pipe, etc. (collectively referred to herein as valve and/or pipeline) with a minimum diameter of 1.5 inches (40 mm) and larger in order to be able to mechanically insert a flow meter into the valve or pipeline.

In the field of industrial valves, much of the equipment, including valves and pipelines, are frequently designed in a standardized way with extra tapped apertures, for example, for the ease of mounting accessories and the like. When the tapped apertures are not used, they are normally plugged by a threaded and sealed cap. When using the tapped aperture, the cap is removed and provides accommodation for, as an example, a manometer. In many of the valves and pipelines used in the waterworks industry, the tapped apertures have a diameter of less than 1 inch (less than 30 mm). The majority of the tapped apertures have a diameter of 0.5 inches (approximately 13 mm), in particular for pipeline equipment between 2 inches and 20 inches (50 mm to 500 mm) in diameter, while other tapped apertures have a diameter of 0.75 inches (approximately 19 mm) or 1.0 inch (approximately 25 mm). However, the size and elbow-shaped configuration of existing flow meters requires a tapped aperture or boss with a minimum diameter of 1.5 inches (at least 38 mm). Accordingly, there is a continuing need for a vortex flow meter which is capable of being inserted into valves and pipelines having insert apertures or bosses with a diameter of less than 1.0 inch (approximately 25 mm) or even into such insertion apertures having a diameter of only 0.5 inches (approximately 13 mm). What is also needed is such a vortex flow meter which can detect and accurately measure fluid flow velocities less than 1.5 feet/second (0.5 m/s). The present invention fulfills these needs, and provides other related advantages.

SUMMARY OF THE INVENTION

The present invention resides in a valve or pipeline fluid flow meter. The flow meter generally comprises a fitting adapted to be attached to the valve or pipeline and extend at least partially through an insertion aperture thereof such that a first end of the fitting is disposed in the valve or pipeline. A measurement cylinder is pivotally attached to the first end of the fitting and includes a fluid vortex generating obstruction, wherein the measurement cylinder is selectively movable from a position generally aligned with a primary axis of the fitting for insertion through the aperture of the valve or pipeline into a position generally parallel to the flow of fluid through the valve or pipeline. A sensor element is disposed downstream of the obstruction for detecting fluid vortices generated by the obstruction.

The pivotal connection between the measurement cylinder and the fitting allow the measurement cylinder to have a length greater than the diameter of the valve or pipeline aperture. This is the case even when the valve or pipeline insertion aperture is less than 30 mm in diameter.

The sensor element is spaced from and generally aligned with the fluid vortex generating obstruction. Typically, the sensor element is at least partially disposed within the measurement cylinder so as to be generally aligned with the fluid vortex generating obstruction which extends from an inner wall of the measurement cylinder. In a particularly preferred embodiment, the sensor element is connected to a sensor body extending through the fitting. The measurement cylinder includes a slot adapted to receive the sensor element therethrough. In one embodiment, the fitting includes a groove which receives a projection of the sensor body in order to align the sensor element with the measurement cylinder slot.

The sensor element typically comprises a piezoelectric sensor element. A locking ring may be used to secure the fitting and the sensor body to one another and hold the sensor element in proper position relative to the obstruction within the measurement cylinder.

The sensor element is in communication with an electronic circuit adapted to receive signals from the sensor element and determine fluid flow velocity through the valve or pipeline. The flow meter detects and measures fluid velocity through the valve or pipeline. This includes fluid flow velocities less than 0.5 m/s and including fluid flow velocities between 0.2 and 0.5 m/s.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a fluid flow meter for a valve or pipeline. As will be described more fully herein, the flow meter of the present invention can be inserted into smaller apertures of valves or pipelines than currently known fluid flow meters. Moreover, the fluid flow meter of the present invention is able to detect and measure relatively low fluid flow rates which are commonly encountered in the waterworks industry.

Figure 1:
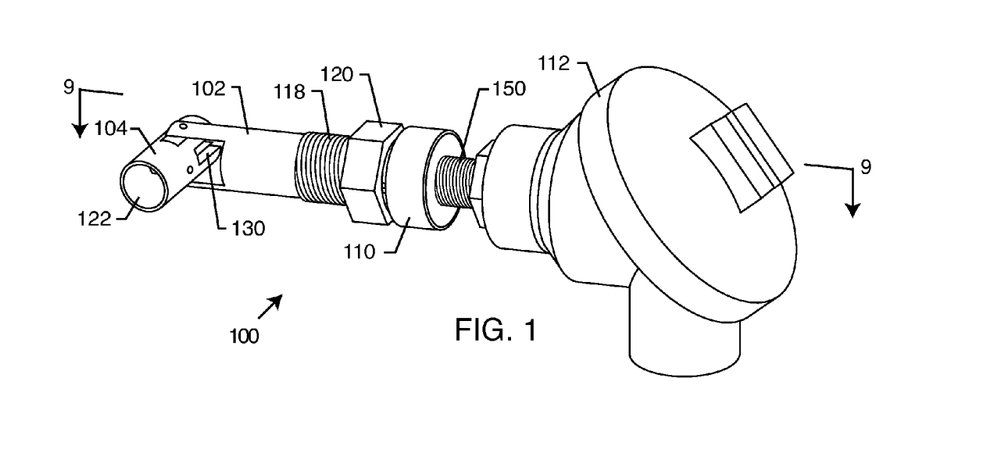
FIG. 1 is a side perspective view of the flow meter embodying the present invention.
Figure 2:
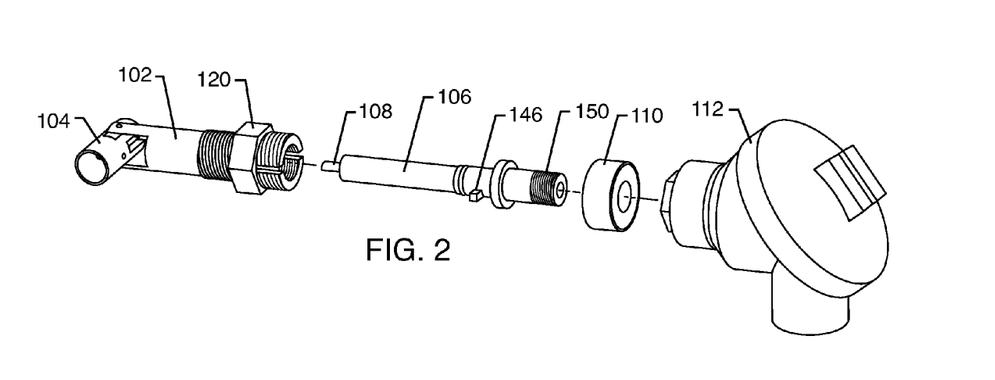
FIG. 2 is an exploded perspective view of the flow meter, illustrating the interconnection of various component parts thereof.

With reference now to FIGS. 1 and 2, a flow meter 100 embodying the present invention is shown. The flow meter is generally comprised of a fitting 102 having a measurement cylinder 104 pivotally attached to an end thereof. A sensor body 106 having a sensor 108 at an end thereof is received within the hollow fitting 102. A locking ring 110 securely connects the fitting 102 and the sensor body 106. A head unit 112 is attached to the end of the sensor body 106, and typically includes electronic circuits in communication with the sensor 108, as will be more fully explained herein.

Figure 3:
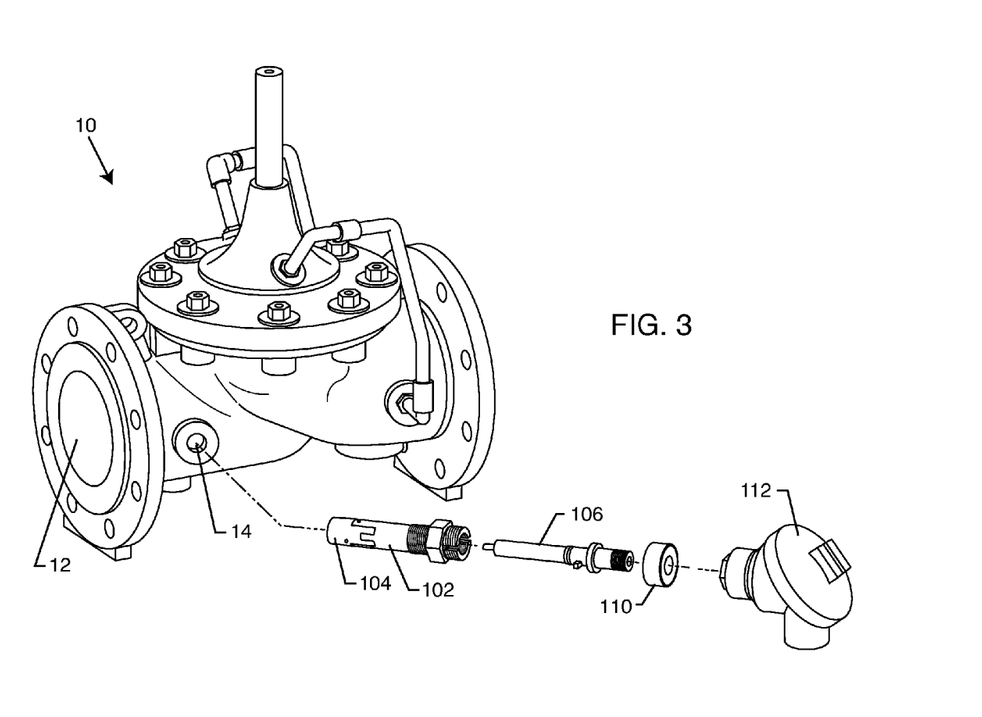
FIG. 3 is a partially exploded perspective view of the flow meter and an insertion aperture of a valve, in accordance with the present invention.

With reference now to FIG. 3, an exemplary valve 10 of a drinking water/waterworks system is shown. It will be understood by those skilled in the field of the present invention that the valve 10 can comprise other types of valves, filters, joints, or even segments of pipeline. The valve 10 has an inlet 12 which corresponds to the diameter of the adjoining pipe or device. The inner diameter of the inlet 12 or pipeline is typically between 2 inches and 20 inches in diameter (approximately 5 cm-50 cm). As described above, the valves, pipeline, etc. 10 are often manufactured with apertures for insertion and attachment of various devices, meters, etc. These are usually plugged securely until needed. One such insertion aperture 14 is illustrated in FIG. 3. In the waterworks industry, particularly for the size of pipelines associated therewith, as described above, the insertion apertures 14 are typically ½" (approximately 13 mm), ¾" (approximately 19 mm) and 1" (approximately 25 mm) in diameter. The 0.5 inch diameter insertion apertures are very common.

As explained above, flow meters require a length of at least 1.5 inches (approximately 40 mm), thus requiring that the insertion aperture of the valve or pipeline be at least 1.5 inches in diameter. However, the flow meter 100 of the present invention overcomes this drawback. As illustrated in FIG. 3, the measurement cylinder 104 is pivotally attached to the fitting 102, such as by means of pins 114 and 116, so as to be positioned generally in alignment with the fitting 102, and move to a position generally transverse to the fitting 102, as illustrated in FIGS. 1 and 2. The fitting 102 and measurement cylinder 104 have an outer diameter which is less than the inner diameter of the insertion aperture 14, so as to be inserted therethrough and into the valve or pipeline 10. The fitting 102 is secured to the valve or pipeline 10 by means of threaded engagement between the threads 118 of the fitting 102 and those of the insertion aperture 14. This may be done by means of the beveled nut portion 120 of the fitting 102 so as to turn and drive the fitting 102 into the insertion aperture 14, such as by means of pliers, socket wrenches or the like.

Figure 4:
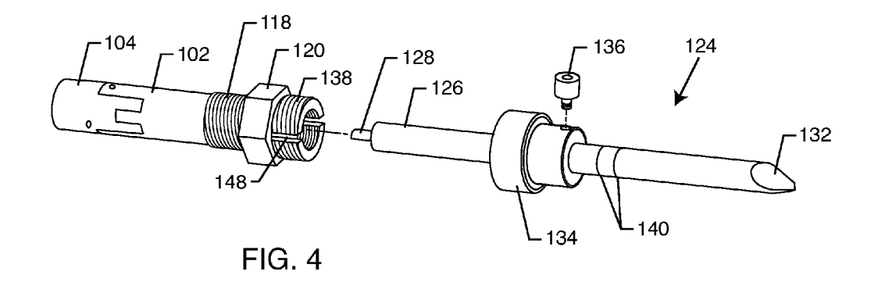
FIG. 4 is an exploded perspective view of a tool for positioning a measurement cylinder of the flow meter of the present invention.
Figure 5:
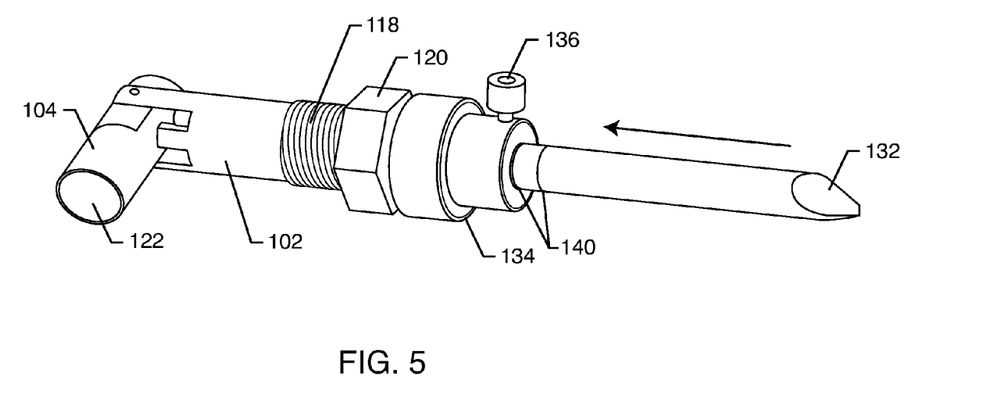
FIG. 5 is similar to FIG. 4, illustrating use of the tool to move the measurement cylinder into position.

With reference now to FIGS. 3-5, in order to be insertable through an insertion aperture 14 having a diameter of less than 1" (approximately 25 mm), the measurement cylinder 104 must be in alignment with the primary axis of the fitting 102 so as to be inserted through the insertion aperture 14 and into the valve or pipeline 10. However, in order to function properly, an inlet 122 of the measurement cylinder 104 must be positioned so as to generally face the fluid flow, and thus the measurement cylinder 104 must be generally parallel with the fluid flowing through the valve or pipeline 10.

Accordingly, the present invention incorporates a tool 124 to selectively move the measurement cylinder 104. The tool is comprised of an elongated shaft 126 having at one end a relatively thin member 128 mimicking a sensor capable of being inserted into a slot 130 formed in the measurement cylinder 104. The shaft 126 has a beveled end 132 at an opposite end thereof. The shaft 126 is extendable through a ring 134 having a thumb screw 136 extending therein and into engagement with the shaft 126. The ring 134 is configured so as to threadingly receive exterior threads 138 of the fitting 102.

When installing the flow meter 100 of the present invention, after securing the fitting 102 to the valve or pipeline 10, as described above, the "sensor" end 128 of the tool 124 is inserted into the fitting 102 wherein the mimic sensor end 128 engages an inner wall of the measurement cylinder 104, and as the tool 124 is extended into the valve or pipeline 10, the measurement cylinder 104 pivots, with the mimic sensor end 128 of the tool 124 extending through slot 130 of the measurement cylinder 104, until the measurement cylinder 104 is pivoted approximately ninety degrees such that it is generally transverse to the primary axis of the fitting 102, and the inlet 122 thereof is facing the fluid flow through the pipeline or valve 10. The tool 124 may include markings 140 on the shaft 126, indicating to the installer positioned outside of the valve or pipeline 10 when the measurement cylinder 104 has been fully pivoted and properly positioned. For example, once the shaft 126 has been inserted to the point where a measurement marking 140 is generally aligned with the ring 134, the installer knows that the measurement cylinder 104 has been pivoted the full ninety degrees. Different measurement markings 140 may be formed on the tool 124 to accommodate measurement cylinders 104 or insertion apertures 14 of different sizes.

Figure 6:
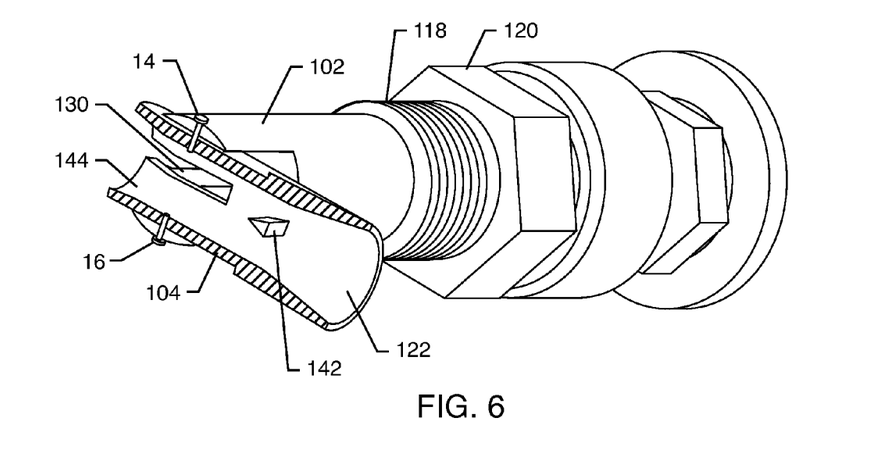
FIG. 6 is an enlarged and partially sectioned view of a fitting and the measurement cylinder moved into a measurement reading position, in accordance with the present invention.

With reference now to FIG. 6, as described above, the measurement cylinder 104 is properly positioned when it is generally transverse to the primary axis of the fitting 102, such that the inlet 122 thereof generally faces the oncoming fluid. The fluid passes through the cylinder 104 and encounters an obstruction, sometimes referred to in the art as a bluff body 142, which creates disturbances in the fluid flow, which are vortex in nature having high and low pressure areas which can be detected by the sensor of the present invention. Fluid then passes through the cylinder 104 and to an outlet 144 of the measurement cylinder. As will be explained more fully herein, a sensor extends into the measurement cylinder 104 downstream of the obstacle 142 so as to detect the vortices generated by the obstruction 142.

Figure 7:
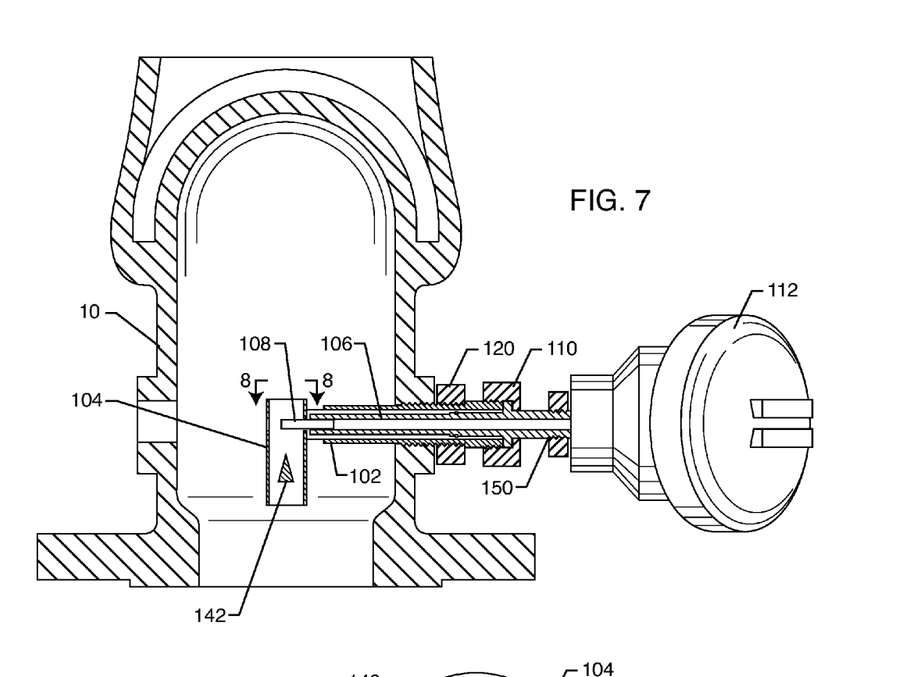
FIG. 7 is a cross-sectional view of the valve and flow meter of the present invention.
Figure 8:
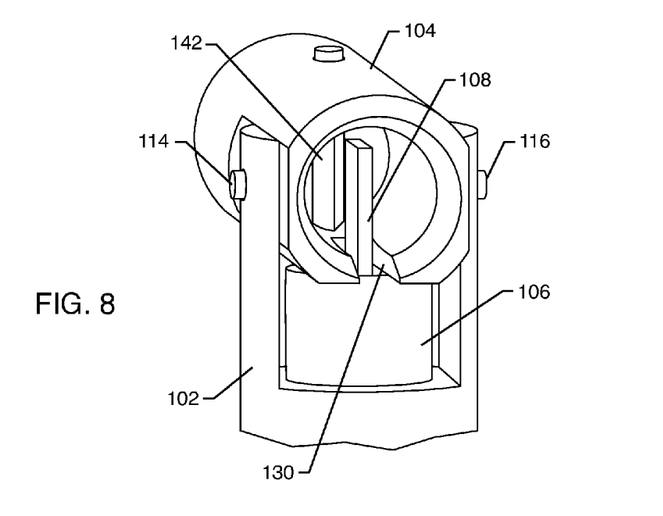
FIG. 8 is a rear perspective view of the measurement cylinder and a sensor taken generally along line 8-8 of FIG. 7.

With reference now to FIGS. 7 and 8, once the measurement cylinder 104 has been properly positioned using tool 124, tool 124 is removed and the sensor body 106 is inserted into the fitting 102 such that the sensor 108 at the end thereof extends through the slot 130 of the measurement cylinder 104, so as to be disposed within the measurement cylinder 104 at a position spaced apart from the bluff body obstacle 142 and downstream from the bluff body obstacle 142 so as to detect the fluid disturbances created by the obstacle 142.

With reference now to FIGS. 2 and 7, it is important that the sensor body 106, and thus the sensor 108, be properly aligned such that the sensor 108 extends through slot 130 of the measurement cylinder 104 so as to be disposed downstream, and generally aligned with, the bluff body obstacle 142. The sensor 108 is a piezoelectric sensor and thus forcefully moving the sensor 108 into contact with an object or surface can damage the sensor 108, and possibly render it inoperable. As such, the sensor body 106 includes a projection or tab 146 which is received within groove 148 of the fitting 102. In this manner, the sensor body 106 is properly aligned and positioned such that the sensor 108 extends through slot 130 and is aligned with and spaced appropriately from the bluff body obstacle 142, as illustrated in FIGS. 7 and 8.

With continuing reference to FIGS. 2 and 7, once the sensor body 106 and sensor 108 are appropriately positioned, the locking ring 110, which is internally threaded, engages the threaded portion 138 of the fitting 102, so as to securely hold the fitting 102 and the sensor body 106 to one another. Typically, generally opposite the sensor 108 are exterior threads 150 formed on the sensor body 106 for attachment of the head unit 112, as illustrated in FIG. 7.

Figure 9:
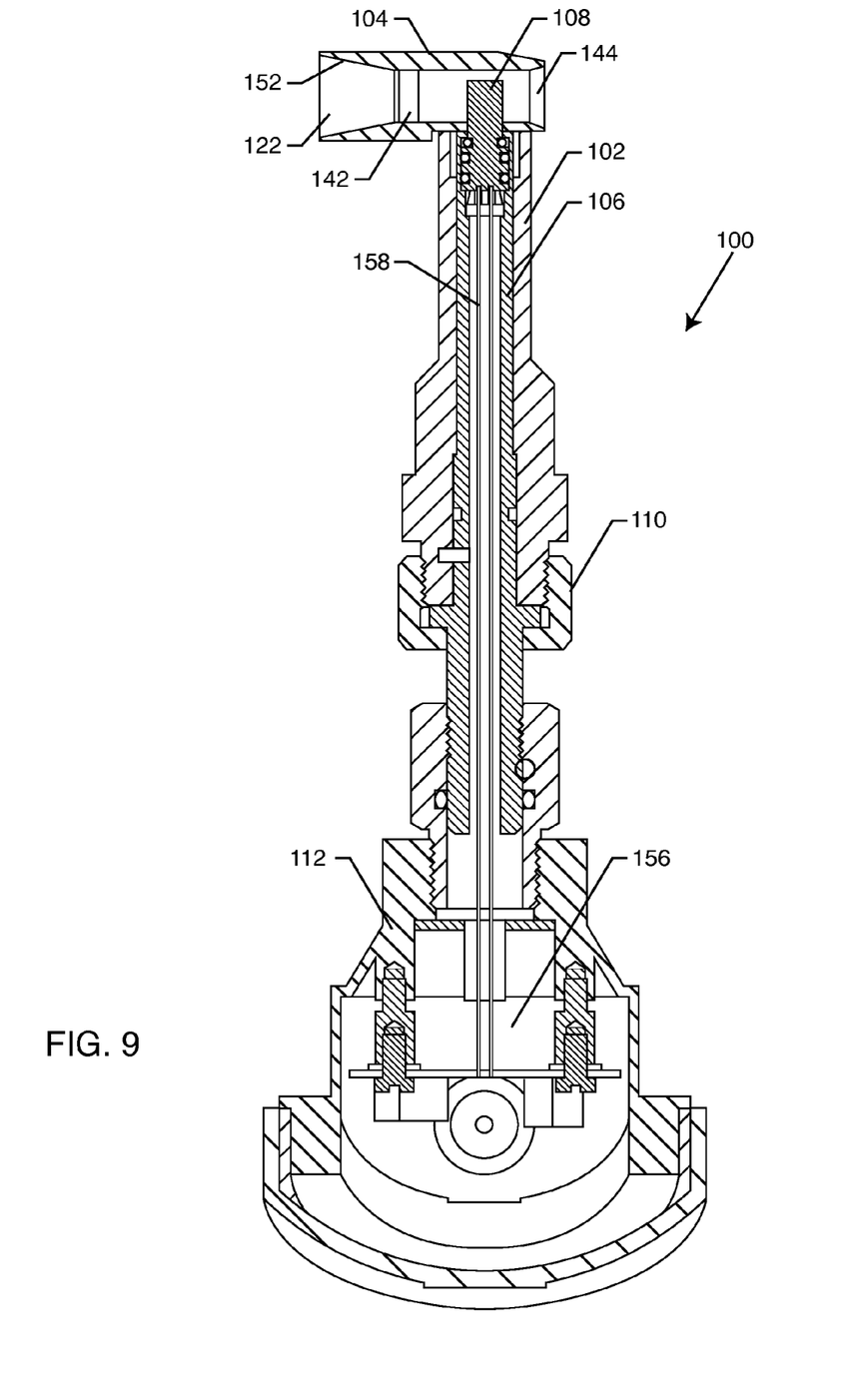
FIG. 9 is a cross-sectional view taken generally along line 9-9 of FIG. 1.

With reference now to FIG. 9, a cross-sectional view of the flow meter 100 embodying the present invention is shown in position to detect and measure flow velocity of the fluid passing through the valve or pipeline 10. It will be seen that the inner wall 152 is slightly tapered at the inlet 122 of the measurement cylinder 104, and slightly tapered at the outlet 144 of the measurement cylinder 104, which facilitates the flow through the measurement cylinder 104.

As described above, and as illustrated in FIGS. 10 and 13, when fluid flows through the measurement cylinder 104, as shown by the directional arrows, the fluid encounters the bluff body obstacle 142 which causes the creation of vortices 154, shown by the spiraled arrows. The vortices 154, also known as Karman vortex street, are detected as they pass by the sensor 108. Upon detecting the fluid disturbance, in the form of a high and low pressure vortex 154, a signal is generated and sent to an electronic circuit 156 which can further measure or analyze the signals as necessary to calculate a flow rate. The sensor 108 is typically in electronic communication with the electronic circuit 156 by means of electrical wires 158, as illustrated in FIG. 9. The electronic circuit 156 is typically disposed within the head unit 112. In addition, or alternatively, the electronic circuit 156 may be in electronic communication with another electronic circuit, processors, or the like outside of the head unit 112 which further measure and/or analyze the signals and data generated.

Figure 10:
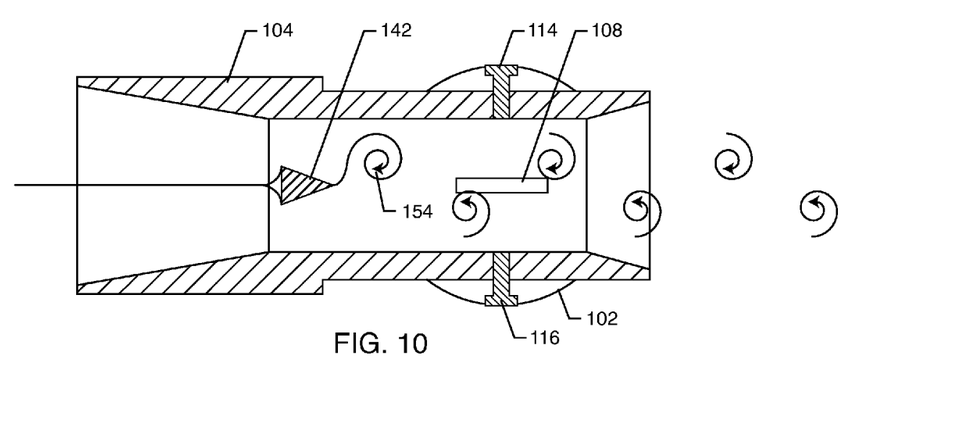
FIG. 10 is a diagrammatic cross-sectional view of the measurement cylinder and sensor of the flow meter of the present invention in a high flow condition.
Figure 11:
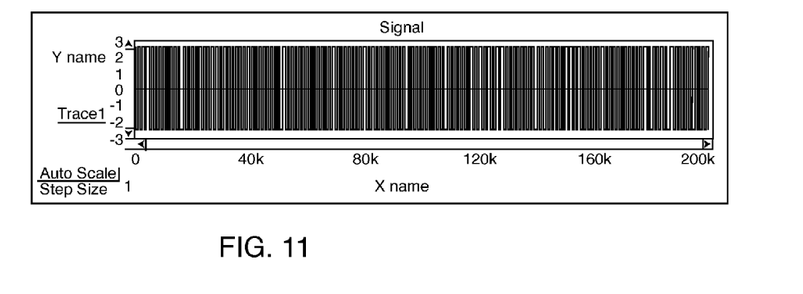
FIG. 11 is a graph depicting the signal measurement of the flow of FIG. 10.
Figure 12:
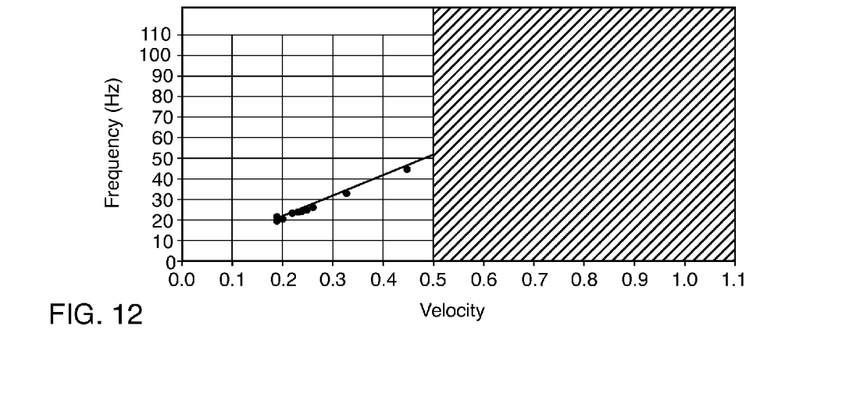
FIG. 12 is a graph illustrating the transitional flow velocity of the fluid of FIG. 10.

With reference now to FIGS. 10-12, the detached swirls or vortex disturbances in the fluid flow caused by the passage of the fluid over the obstacle 142 generate zones of variable pressure. These zones of variable pressure are detected by the sensor 108, and more particularly by means of piezoelectric crystals encapsulated within the sensor 108. The high and low pressure regions create forces on the sensor 108 that move it back and forth across its neutral axis, alternating between high and low pressure, and thus registers as a "count" to which a signal is generated and sent to the electronic circuit 156.

Traditionally, piezoelectric sensors have been used to detect flow by measuring the degree of mechanical deflection of the sensor caused by the Karman vortex street. However, in accordance with the present invention, the flow meter 100 does not measure deflection, but rather counts the deflection events and outputs a frequency based on the deflection caused by the Karman vortex street. FIG. 11 is a diagram representing the number of counts or deflection events in the signal(s) received by the electronic circuit 156 from the sensor 108. FIG. 12 is a diagram illustrating the frequency of the signal, representing the number of deflection events, and thus the velocity (in meters per second) represented by the far right shaded portion of the diagram, indicating a fluid flow rate above 0.5 m/s, and thus having a turbulent flow velocity or a Reynolds number exceeding 5000.

Figure 13:
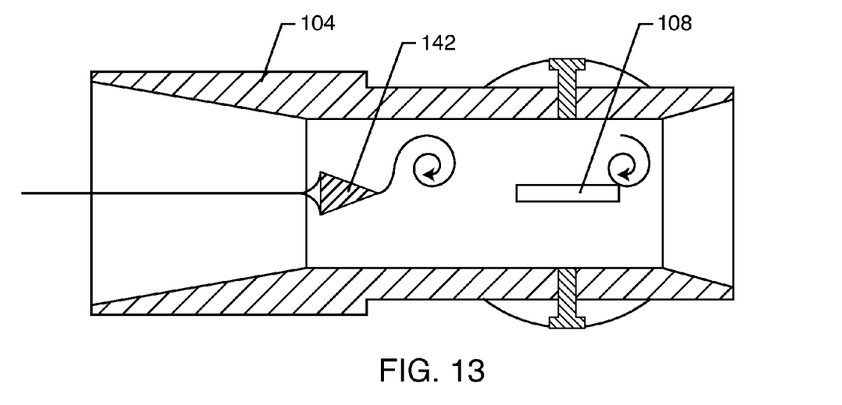
FIG. 13 is a cross-sectional and diagrammatic view similar to FIG. 10, but under a lower flow condition.
Figure 14:
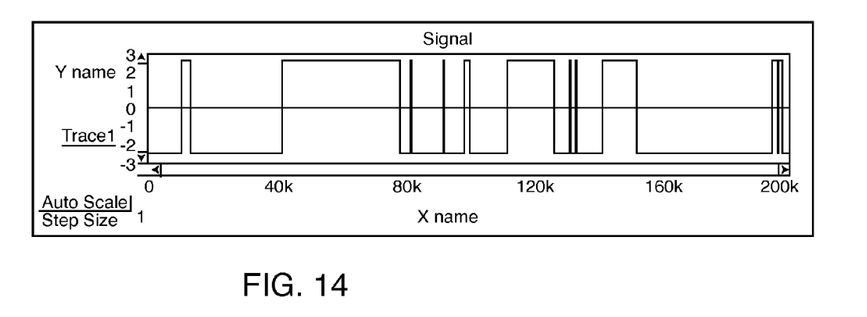
FIG. 14 is a diagram illustrating signal measurement of the fluid flow of FIG. 13.
Figure 15:
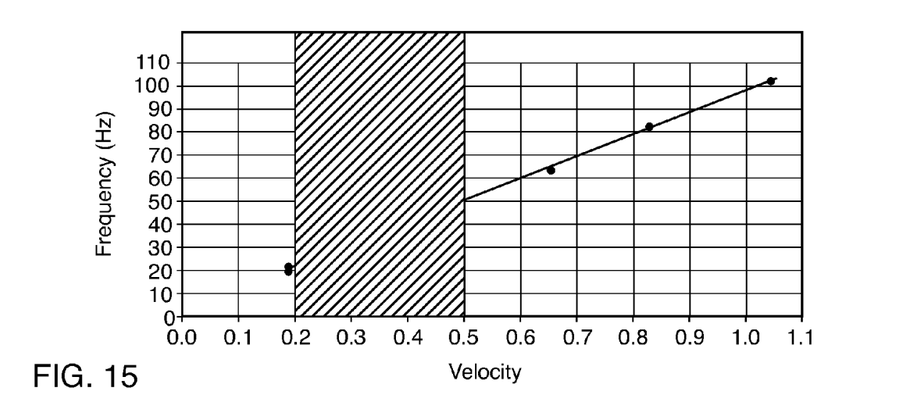
FIG. 15 is a graph illustrating the laminar flow of velocity of the flow of FIG. 13.

With reference now to FIGS. 13-15, similar illustrations are provided for a fluid flow rate between 0.2 and 0.5 m/s, or a Reynolds number of between 2000 and 5000. It will be seen that the number of disturbances or high/low pressure vortexes generated are fewer, and thus are the number of count events or frequency signal, as illustrated in the diagram of FIG. 14. Thus, it is determined and calculated that the flow velocity is between 0.2 and 0.5 m/s, as illustrated in the shaded portion of FIG. 15.

Figure 16:
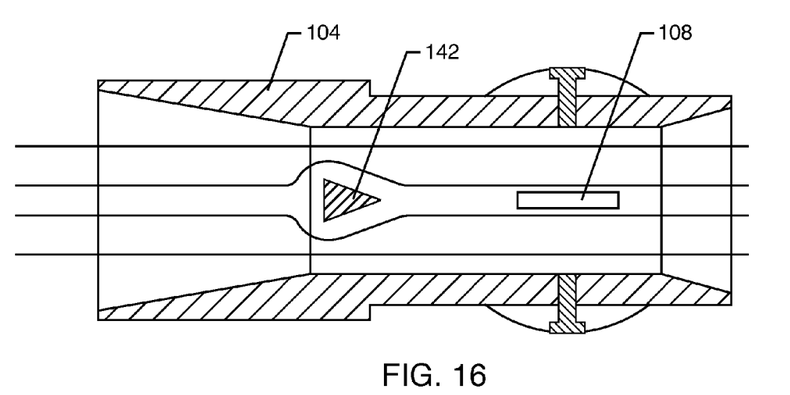
FIG. 16 is a cross-sectional view of the measurement cylinder and sensor under low flow conditions.
Figure 17:
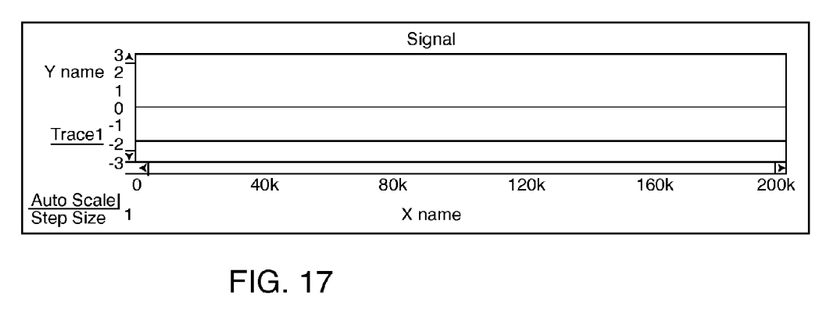
FIG. 17 is a graph depicting the signal measurement of the flow of FIG. 16.
Figure 18:
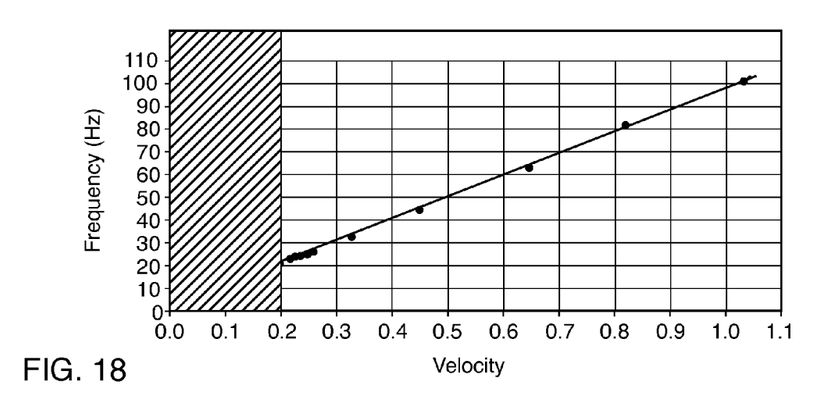
FIG. 18 is a graph depicting the laminar flow of velocity of the fluid flow of FIG. 16.

With reference now to FIGS. 16-18, similar illustrations are provided for fluid flow rate less than 0.2 m/s, or a Reynolds number of less than 2000. Very few, if any, vortex disturbances are generated by the fluid flowing past the obstacle 142, and thus very few signal events are generated, as illustrated in FIG. 17, and thus the system determines and calculates that the fluid flow is less than 0.2 m/s.

Thus, if a large number of high/low pressure vortex fluid disturbances are detected over a short period of time, the frequency of the signal will be greater and thus the fluid flow can be determined and calculated to be a certain velocity. However, the fewer fluid disturbances which are detected over the same amount of time indicates that the fluid is flowing at a much slower velocity, which can be determined and calculated, as illustrated and described with respect to FIGS. 10-18. A unique aspect of the arrangement and method of the present invention is that fluid flow rates between 0.2 and 0.5 m/s can be detected, measured and calculated. Moreover, fluid flow rates less than 0.2 m/s or greater than 0.5 m/s can also be detected.

With reference again to FIGS. 4 and 5, in the event that the flow meter must be removed from the valve or pipeline 10, such as during replacement, repair or cleaning, etc., after removing the head unit 112, locking ring 110, and sensor body 106, the tool 124 is used to once again straighten the measurement cylinder 104 such that it can be removed from the insertion aperture 14. The insertion aperture 14 is typically between ½" to 1" (approximately 13 mm-25 mm) and the measurement cylinder 104 has a length, typically more than 30 mm, which exceeds that diameter. Thus, the measurement cylinder 104 must be placed back into alignment with the fitting 102. This is achieved by means of the beveled end 132 of the shaft 126 of the tool 124 which is engaged with the measurement cylinder 104 and rotated in such a manner so as to move the measurement cylinder 104 from the position illustrated in FIG. 5 to that illustrated in FIG. 4 such that the fitting 102 and measurement cylinder 104 can be removed from the valve or pipeline 10.

Although several embodiments have been described in detail for purposes of illustration, various modifications may be made without departing from the scope and spirit of the invention. Accordingly, the invention is not to be limited, except as by the appended claims.

What is claimed is:

1. A fluid flow meter comprising:
    a fitting configured to be attached to a valve or pipeline adjacent to an insertion aperture of the valve or pipeline and extend at least partially through the insertion aperture such that a first end of the fitting is disposed in the valve or pipeline;
    a measurement cylinder, having generally opposite first and second ends open to fluid flow, pivotally attached to the first end of the fitting and including a fluid vortex generating obstruction, wherein the measurement cylinder is selectively movable from a position generally aligned with a primary axis of the fitting for insertion through the aperture of the valve or pipeline and to a position generally parallel to the flow of fluid through the valve or pipeline, such that the fluid flows through the measurement cylinder, after insertion into the valve or pipeline; and
    a sensor element at least partially disposed within the measurement cylinder and spaced from and generally aligned with the obstruction so as to be downstream the obstruction for detecting fluid vortices generated by the obstruction;
    wherein the measurement cylinder has a length greater than an outer diameter of the measurement cylinder.

2. The flow meter of claim 1, wherein the measurement cylinder has a length greater than the diameter of the valve or pipeline insertion aperture.

3. The flow meter of claim 2, wherein the insertion aperture of the valve or pipeline is less than 30 mm in diameter.

4. The flow meter of claim 1, wherein fluid vortex generating obstruction extends from an inner wall of the measurement cylinder.

5. The flow meter of claim 1, wherein a wall of the measurement cylinder includes a slot generally aligned with the insertion aperture of the valve or pipeline when the measurement cylinder is pivoted to a position generally parallel to the fluid flow so as to receive the sensor element therethrough and into the measurement cylinder.

6. The flow meter of claim 4, wherein the sensor element is connected to a sensor body extending through the fitting.

7. The flow meter of claim 6, wherein the fitting includes a groove which receives a projection of the sensor body for aligning the sensor element with the measurement cylinder slot.

8. The flow meter of claim 6, including a locking ring for securing the fitting and sensor body to one another.

9. The flow meter of claim 1, wherein the sensor element comprises a piezoelectric sensor element.

10. The flow meter of claim 1, wherein the sensor element is in electric communication with an electronic circuit configured to receive signals from the sensor element and determine fluid flow velocity through the valve or pipeline.

11. The flow meter of claim 10, wherein the flow meter detects and measures fluid velocities through the valve or pipeline, including less than 0.5 meters per second.

12. The flow meter of claim 1, wherein an internal wall of the measurement cylinder adjacent to the first and second ends are tapered.

13. A fluid flow meter comprising:
    a fitting configured to be attached to a valve or pipeline adjacent to an insertion aperture of the valve or pipeline and extend at least partially through the insertion aperture such that a first end of the fitting is disposed in the valve or pipeline;
    a measurement cylinder, having generally opposite first and second ends open to fluid flow, pivotally attached to the first end of the fitting and including a fluid vortex generating obstruction disposed therein; and
    a sensor body extending through the fitting and having a sensor element at an end thereof at least partially disposed in the measurement cylinder so as to be spaced downstream from and generally aligned with the obstruction and detect fluid vortices generated by the obstruction;
    wherein the measurement cylinder is selectively movable from a position generally aligned with a primary axis of the fitting for insertion through the valve or pipeline insertion aperture and to a position generally transverse to the primary axis of the fitting and generally parallel to fluid flowing through the valve or pipeline, such that fluid flows through the measurement cylinder, after insertion into the valve or pipeline; and
    wherein the measurement cylinder has a length greater than the diameter of the valve or pipeline insertion aperture.

14. The flow meter of claim 13, wherein the valve or pipeline insertion aperture has a diameter of less than 30 mm.

15. The flow meter of claim 13, wherein a wall of the measurement cylinder includes a slot for receiving the sensor element therethrough when the measurement cylinder is moved to the position generally parallel to the fluid flow.

16. The flow meter of claim 15, wherein the fitting includes a groove which receives a projection of the sensor body for aligning the sensor element with the measurement cylinder slot.

17. The flow meter of claim 13, including a locking ring for securing the fitting and sensor body to one another.

18. The flow meter of claim 13, wherein the sensor element comprises a piezoelectric sensor element.

19. The flow meter of claim 13, wherein the sensor element is in electric communication with an electronic circuit adapted to receive signals from the sensor element and determine fluid flow velocity through the valve or pipeline.

20. The flow meter of claim 19, wherein the flow meter detects and measures fluid velocities through the valve or pipeline, including less than 0.5 meters per second.

21. The flow meter of claim 13, wherein an internal wall of the measurement cylinder adjacent to the first and second ends are tapered.

22. A fluid flow meter comprising:
- a fitting adapted to be attached to a valve or pipeline and extend at least partially through an insertion aperture thereof having a diameter of less than 30 mm such that a first end of the fitting is disposed in the valve or pipeline;
- a measurement cylinder having generally opposite first and second ends open to fluid flow and a length of more than 30 mm pivotally attached to the first end of the fitting and including a fluid vortex generating obstruction disposed therein;
- a sensor body extending through the fitting and having a sensor element at an end thereof at least partially disposed in the measurement cylinder so as to be spaced downstream from and generally aligned with the obstruction and detect fluid vortices generated by the obstruction; and
- an electronic circuit in communication with the sensor and adapted to receive signals from the sensor element and determine fluid flow velocity through the valve or pipeline, including less than 0.5 meters per second;
- wherein the measurement cylinder is selectively movable from a position generally aligned with a primary axis of the fitting for insertion through the valve or pipeline insertion aperture and to a position generally transverse to the primary axis of the fitting and generally parallel to fluid flowing through the valve or pipeline, such that the fluid flows through the measurement cylinder, after insertion into the valve or pipeline.

23. The flow meter of claim 22, wherein a wall of the measurement cylinder includes a slot for receiving the sensor element therethrough when the measurement cylinder is moved to the position generally parallel to the fluid flow.

24. The flow meter of claim 23, wherein the fitting includes a groove which receives a projection of the sensor body for aligning the sensor element with the measurement cylinder slot.

25. The flow meter of claim 22, including a locking ring for securing the fitting and sensor body to one another.

26. The flow meter of claim 22, wherein the sensor element comprises a piezoelectric sensor element.

27. The flow meter of claim 22, wherein an internal wall of the measurement cylinder adjacent to the first and second ends are tapered.

\* \* \* \* \*